United States Patent
Koyama et al.

(10) Patent No.: US 9,987,904 B2
(45) Date of Patent: Jun. 5, 2018

(54) FUEL CELL VEHICLE AIR-CONDITIONING APPARATUS AND CONTROL METHOD THEREOF

(71) Applicants: Takashi Koyama, Kariya (JP); Yuichi Sakajo, Toyohashi (JP); Keigo Suematsu, Toyota (JP)

(72) Inventors: Takashi Koyama, Kariya (JP); Yuichi Sakajo, Toyohashi (JP); Keigo Suematsu, Toyota (JP)

(73) Assignee: TOYOTA JIDOSHA KABUSHIKI KAISHA, Toyota-shi (JP)

( * ) Notice: Subject to any disclaimer, the term of this patent is extended or adjusted under 35 U.S.C. 154(b) by 522 days.

(21) Appl. No.: 14/362,493

(22) PCT Filed: Nov. 28, 2012

(86) PCT No.: PCT/IB2012/002508
§ 371 (c)(1),
(2) Date: Jun. 3, 2014

(87) PCT Pub. No.: WO2013/084038
PCT Pub. Date: Jun. 13, 2013

(65) Prior Publication Data
US 2014/0342260 A1 Nov. 20, 2014

(30) Foreign Application Priority Data

Dec. 6, 2011 (JP) .................................. 2011-266821

(51) Int. Cl.
*B60H 1/00* (2006.01)
*B60H 1/03* (2006.01)
(Continued)

(52) U.S. Cl.
CPC ............. *B60H 1/034* (2013.01); *B60H 1/143* (2013.01); *B60L 1/003* (2013.01); *B60L 1/02* (2013.01);
(Continued)

(58) Field of Classification Search
CPC .... B60H 1/034; B60H 1/143; B60H 1/00385; B60H 2001/2228; H01M 8/04014;
(Continued)

(56) References Cited

U.S. PATENT DOCUMENTS

2001/0018832 A1 9/2001 Matsunaga et al.
2005/0233191 A1* 10/2005 Ushio ............... H01M 8/04022
429/414
(Continued)

FOREIGN PATENT DOCUMENTS

JP 2001-315524 A 11/2001
JP 2004-146144 A 5/2004
(Continued)

*Primary Examiner* — Eugenia Wang
(74) *Attorney, Agent, or Firm* — Hunton Andrews Kurth LLP

(57) ABSTRACT

A fuel cell vehicle air-conditioning apparatus includes: a cooling system that adjusts a temperature of a fuel cell; a waste heat collection unit that collects at least a part of waste heat from the fuel cell and uses the collected waste heat to heat a cabin interior of the fuel cell vehicle; and a heat creation unit that creates heat for heating the fuel cell vehicle. The fuel cell vehicle air-conditioning apparatus calculates a fuel consumption amount required for the fuel cell to generate a total power generation amount, which is a sum of a heating power generation amount and a travel power generation amount, calculates an optimum temperature, which is a temperature of the fuel cell at which the fuel consumption amount reaches a minimum, and controls the
(Continued)

cooling system such that the temperature of the fuel cell reaches the optimum temperature.

8 Claims, 5 Drawing Sheets

(51) Int. Cl.

| | | |
|---|---|---|
| *B60H 1/14* | (2006.01) | |
| *B60H 1/22* | (2006.01) | |
| *H01M 8/04014* | (2016.01) | |
| *H01M 8/04029* | (2016.01) | |
| *H01M 8/04007* | (2016.01) | |
| *H01M 8/04089* | (2016.01) | |
| *H01M 8/04701* | (2016.01) | |
| *H01M 8/04746* | (2016.01) | |
| *H01M 16/00* | (2006.01) | |
| *B60L 1/00* | (2006.01) | |
| *B60L 1/02* | (2006.01) | |
| *B60L 3/00* | (2006.01) | |
| *B60L 7/14* | (2006.01) | |
| *B60L 11/18* | (2006.01) | |
| *H01M 8/04858* | (2016.01) | |
| *H01M 8/0432* | (2016.01) | |

(52) U.S. Cl.
CPC .............. *B60L 3/0053* (2013.01); *B60L 7/14* (2013.01); *B60L 11/1803* (2013.01); *B60L 11/1868* (2013.01); *B60L 11/1887* (2013.01); *B60L 11/1892* (2013.01); *B60L 11/1894* (2013.01); *H01M 8/04014* (2013.01); *H01M 8/04029* (2013.01); *H01M 8/0432* (2013.01); *H01M 8/04052* (2013.01); *H01M 8/0488* (2013.01); *H01M 8/04358* (2013.01); *H01M 8/04701* (2013.01); *H01M 8/04746* (2013.01); *B60H 1/00385* (2013.01); *B60H 2001/2228* (2013.01); *B60L 2210/10* (2013.01); *B60L 2240/34* (2013.01); *B60L 2240/36* (2013.01); *B60L 2240/662* (2013.01); *B60L 2250/16* (2013.01); *H01M 8/04089* (2013.01); *H01M 16/006* (2013.01); *H01M 2250/20* (2013.01); *H01M 2250/405* (2013.01); *Y02B 90/16* (2013.01); *Y02T 10/7066* (2013.01); *Y02T 10/7216* (2013.01); *Y02T 10/7291* (2013.01); *Y02T 90/16* (2013.01); *Y02T 90/32* (2013.01); *Y02T 90/34* (2013.01)

(58) Field of Classification Search
CPC ............. H01M 8/0432; H01M 8/0471; H01M 8/04358; H01M 8/04052; H01M 8/04746; H01M 8/04029; H01M 8/0488; H01M 8/04089; H01M 2250/20; H01M 2250/405; H01M 16/006; B60L 11/1868; B60L 11/1803; B60L 11/1892; B60L 11/1887; B60L 11/1894; B60L 3/0053; B60L 7/14; B60L 1/02; B60L 1/003; B60L 2210/10; B60L 2240/36; B60L 2240/34; B60L 2240/662; B60L 2250/16; Y02T 10/7291; Y02T 10/7066; Y02T 10/7216; Y02T 90/16; Y02T 90/34; Y02T 90/32; Y02B 90/16
See application file for complete search history.

(56) References Cited

U.S. PATENT DOCUMENTS

| | | | |
|---|---|---|---|
| 2009/0233132 A1* | 9/2009 | Hasuka | H01M 8/04089 429/415 |
| 2009/0236436 A1 | 9/2009 | Lienkamp et al. | |
| 2012/0171590 A1* | 7/2012 | Matsumoto | H01M 8/04253 429/442 |

FOREIGN PATENT DOCUMENTS

| | | | | |
|---|---|---|---|---|
| WO | WO 2011033879 A1 * | 3/2011 | ........ | H01M 8/04253 |
| WO | WO 2011074293 A1 * | 6/2011 | ......... | B60H 1/00392 |

\* cited by examiner

F I G . 2
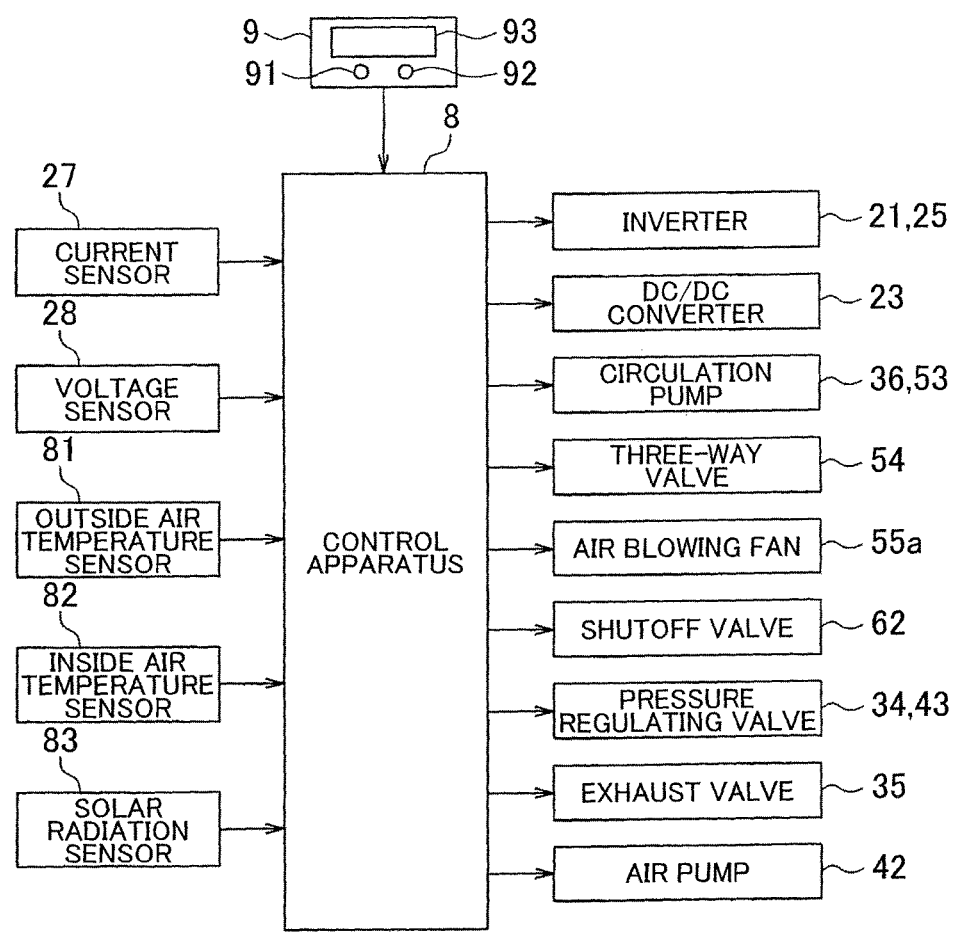

FUEL CELL VEHICLE AIR-CONDITIONING APPARATUS AND CONTROL METHOD THEREOF

CROSS-REFERENCE TO RELATED APPLICATIONS

This is a national phase application based on the PCT International Patent Application No. PCT/IB2012/002508 filed on Nov. 28, 2012, claiming priority to Japanese application No. 2011-266821 filed Dec. 6, 2011, the entire contents of both of which are incorporated herein by reference.

BACKGROUND OF THE INVENTION

1. Field of the Invention

The invention relates to an air-conditioning apparatus applied to a fuel cell vehicle, and a control method thereof.

2. Description of Related Art

In a conventional air-conditioning apparatus for a fuel cell vehicle that includes a fuel cell as a traveling drive source, a heating effect is improved by supplying heat from high-temperature cooling water used to cool the fuel cell, or in other words waste heat from the fuel cell, to a heater core for heating a cabin interior.

A conventional fuel cell vehicle air-conditioning apparatus of this type includes operating state detecting means for detecting or predicting a vehicle stoppage state, and thermal state detecting means for detecting at least one of a fuel cell temperature and an amount of stored heat in a fuel cell system, i.e., an amount of heat that can be used for heating. In the air-conditioning apparatus, when the vehicle stoppage state is detected or predicted during an operation, an amount of fuel cell waste heat collected in a heater core is varied in accordance with an output of the thermal state detecting means (see Japanese Patent Application Publication No. 2004-146144 (JP-2004-146144 A), for example).

According to the related art described in JP-2004-146144 A, the amount of waste heat used for heating is varied in accordance with the thermal state of the fuel cell system, and therefore excessive heat extraction from the fuel cell system can be avoided. As a result, the fuel cell can be maintained at a temperature enabling the fuel cell to operate efficiently, and the fuel cell can be reactivated quickly following a temporary stoppage so that power for the vehicle can be extracted. Hence, heating can be performed during an idling stop by means of a simple configuration.

In the related art described in JP-2004-146144 A, however, use of the waste heat stored in the fuel cell system for performing heating during a normal operation of a fuel cell vehicle is not envisaged.

Further, when surplus waste heat from the fuel cell is simply stored in the fuel cell system during a normal operation in the fuel cell vehicle, the temperature of the fuel cell rises beyond the temperature at which the fuel cell can operate efficiently. As a result, a power generation efficiency of the fuel cell may decrease, leading to deterioration of a fuel efficiency of the vehicle.

SUMMARY OF THE INVENTION

The invention provides a fuel cell vehicle air-conditioning apparatus and a control method thereof with which heating can be performed during a normal operation of the fuel cell vehicle while suppressing deterioration of a fuel efficiency of the vehicle.

A first aspect of the invention is a fuel cell vehicle air-conditioning apparatus including: a fuel cell that generates power by an electrochemical reaction between an oxidant gas and a fuel gas; a cooling system that adjusts a temperature of the fuel cell; a waste heat collection unit that collects at least a part of waste heat from the fuel cell via the cooling system and uses the collected waste heat to heat a cabin interior of the fuel cell vehicle; a heat creation unit that creates heat for heating the fuel cell vehicle; and a control apparatus. The control apparatus includes: a stored heat amount calculation unit configured to calculate an amount of stored heat in the fuel cell; the reference time required heating heat amount calculation unit configured to calculate a required heating heat amount, which is an amount of heat required to perform required heating for a predetermined reference time; the heating power generation amount calculation unit configured to calculate a heating power generation amount, which is an amount of power generation by the fuel cell required for the heating to be performed by the heat creation unit, on the basis of the required heating heat amount and the amount of stored heat in the fuel cell; a travel power generation amount calculation unit configured to calculate a travel power generation amount, which is an amount of power generation by the fuel cell required for the fuel cell vehicle to travel; an optimum temperature calculation unit configured to calculate a fuel consumption amount required for the fuel cell to generate a total power generation amount, which is a sum of the heating power generation amount and the travel power generation amount, and calculate an optimum temperature, which is a temperature of the fuel cell at which the fuel consumption amount reaches a minimum; and a control unit configured to control the cooling system such that the temperature of the fuel cell reaches the optimum temperature.

A second aspect of the invention relates to a control method for a fuel cell vehicle air-conditioning apparatus having a fuel cell that generates power by an electrochemical reaction between an oxidant gas and a fuel gas, a cooling system that adjusts a temperature of the fuel cell, a waste heat collection unit that collects at least a part of waste heat from the fuel cell via the cooling system and uses the collected waste heat to heat a cabin interior of the fuel cell vehicle, and a heat creation unit that creates heat for heating the fuel cell vehicle. The control method includes: calculating an amount of stored heat in the fuel cell; calculating a required heating heat amount, which is an amount of heat required to perform required heating for a predetermined reference time; calculating a heating power generation amount, which is an amount of power generation by the fuel cell required for the heating to be performed by the heat creation unit, on the basis of the required heating heat amount and the amount of stored heat in the fuel cell; calculating a travel power generation amount, which is an amount of power generation by the fuel cell required for the fuel cell vehicle to travel; calculating a fuel consumption amount required for the fuel cell to generate a total power generation amount, which is a sum of the heating power generation amount and the travel power generation amount, and calculating an optimum temperature, which is a temperature of the fuel cell at which the fuel consumption amount reaches a minimum; and controlling the cooling system such that the temperature of the fuel cell reaches the optimum temperature.

According to the configurations described above, the fuel consumption amount can be reduced by calculating the optimum temperature, which is the temperature of the fuel cell at which the fuel consumption amount required for the fuel cell to generate the total power generation amount, i.e. the sum of the heating power generation amount and the travel power generation amount, reaches a minimum, and controlling the cooling system such that the temperature of the fuel cell reaches the optimum temperature, and as a result, deterioration of the vehicle fuel efficiency can be suppressed. Further, this control is executed not only when the vehicle performs an idling stop but also during a normal operation, and therefore heating can be performed in the fuel cell vehicle during a normal operation. As a result, heating can be performed in the fuel cell vehicle during a normal operation while suppressing deterioration of the vehicle fuel efficiency.

When the temperature of the fuel cell exceeds the optimum temperature, the control unit may be configured to perform control to reduce the temperature of the fuel cell to the optimum temperature.

When the temperature of the fuel cell is lower than the optimum temperature, the control unit may be configured to perform control to store the waste heat from the fuel cell in the fuel cell.

According to the configurations described above, when the temperature of the fuel cell is lower than the optimum temperature, the temperature of the fuel cell can be raised toward the optimum temperature by storing the waste heat of the fuel cell in the fuel cell. As a result, deterioration of the vehicle fuel efficiency can be suppressed more reliably.

The heat creation unit may increase an amount of heat discharged from the fuel cell by reducing a power generation efficiency of the fuel cell below that of a normal operation.

The heat creation unit may be an electric heater. The heat creation unit may also be a combustion heater that generates heat by burning a fuel.

The required heating heat amount calculation unit may be configured to calculate the required heating heat amount on the basis of at least one of a target temperature of the cabin interior, which is set by a passenger, a cabin exterior temperature, which is a temperature on a cabin exterior, a cabin interior temperature, which is a temperature in the cabin interior, and a solar radiation amount entering the cabin interior.

The stored heat amount calculation unit may be configured to calculate the amount of heat stored in the fuel cell on the basis of at least one of the temperature of the fuel cell, a heat capacity of the cooling system, and a temperature at or above which the fuel cell exhibits a predetermined power generation capacity.

BRIEF DESCRIPTION OF THE DRAWINGS

Features, advantages, and technical and industrial significance of exemplary embodiments of the invention will be described below with reference to the accompanying drawings, in which like numerals denote like elements, and wherein:

FIG. 2 is a block diagram showing an electric control unit of the fuel cell vehicle air-conditioning apparatus;

DETAILED DESCRIPTION OF EMBODIMENTS

Figure 1:
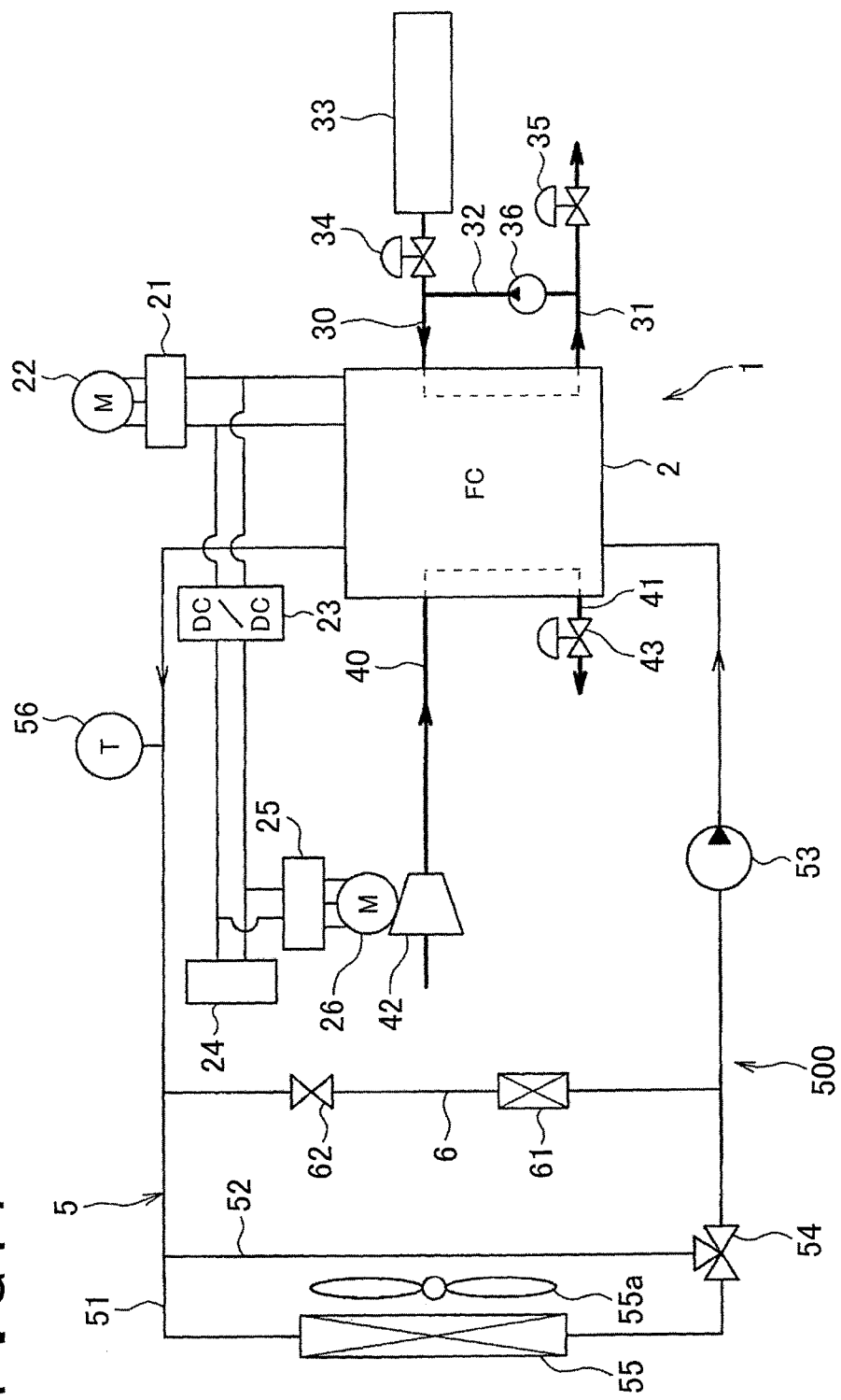
FIG. 1 is an overall configuration diagram showing a fuel cell vehicle air-conditioning apparatus according to an embodiment of the invention.

An embodiment of the invention will be described below on the basis of FIGS. 1 to 7. FIG. 1 is an overall configuration diagram showing a fuel cell vehicle air-conditioning apparatus according to this embodiment. A fuel cell vehicle air-conditioning apparatus 1 is applied to a so-called fuel cell vehicle, which is a type of electric vehicle.

As shown in FIG. 1, the fuel cell vehicle air-conditioning apparatus 1 includes a fuel cell 2 that generates power by an electrochemical reaction between air (an oxidant gas) and hydrogen (a fuel gas). The fuel cell 2 is formed with a stacked structure in which a plurality of single cells that generate power when supplied with air and hydrogen are stacked.

A part of the direct current power generated by the fuel cell 2 is converted into an alternating current by a first inverter 21 and supplied to various electric loads such as a vehicle travel electric motor 22. A further part of the direct current power generated by the fuel cell 2 is stepped up and down by a direct current-direct current (DC/DC) converter 23 and charged to a secondary battery 24 serving as a power storage unit. Further, a part of the power stepped up and down by the DC/DC converter 23 is converted into an alternating current by a second inverter 25 and supplied to an air pump electric motor 26 of an air pump 42 to be described below.

The fuel cell vehicle according to this embodiment performs regenerative braking using the vehicle travel electric motor 22 and so on during deceleration and downhill travel. Regenerated power obtained from the regenerative braking is stored in the secondary battery 24.

A hydrogen supply pipe 30 for supplying hydrogen to the respective single cells and a hydrogen exhaust pipe 31 that discharges generated water and nitrogen remaining in the interiors of the respective single cells to the exterior of the fuel cell 2 together with unreacted hydrogen are connected to the fuel cell 2. The hydrogen supply pipe 30 and the hydrogen exhaust pipe 31 according to this embodiment are connected to each other via a hydrogen circulation pipe 32.

A high pressure hydrogen tank 33 filled with high pressure hydrogen is provided in a furthest upstream portion of the hydrogen supply pipe 30. Further, a hydrogen pressure regulating valve 34 that regulates a pressure of the hydrogen supplied to the fuel cell 2 to a predetermined pressure is provided in the hydrogen supply pipe 30 between the high pressure hydrogen tank 33 and the fuel cell 2.

An exhaust valve 35 for discharging hydrogen to the exterior of the fuel cell 2 is provided in the hydrogen exhaust pipe 31. When the exhaust valve 35 is open, hydrogen, steam (or water), and impurities are discharged through the hydrogen exhaust pipe 31 from a hydrogen electrode side of the fuel cell 2. The impurities include nitrogen and oxygen that pass through an electrolyte membrane from an air electrode side of the fuel cell 2 to the hydrogen electrode side of the fuel cell 2.

The hydrogen circulation pipe 32 bifurcates from the hydrogen exhaust pipe 31 upstream of the exhaust valve 35 and is connected to the hydrogen supply pipe 30 downstream of the hydrogen pressure regulating valve 34. As a result, fuel off-gas containing unreacted hydrogen that flows out of the fuel cell 2 is circulated, and thereby resupplied, to the fuel cell 2. Further, a hydrogen circulation pump 36 that circulates the fuel off-gas to the hydrogen supply pipe 30 is disposed in the hydrogen circulation pipe 32.

Furthermore, an air supply pipe 40 for supplying air to the respective single cells and an air exhaust pipe 41 that discharges the generated water remaining in the interiors of the respective single cells to the exterior of the fuel cell 2 together with air are connected to the fuel cell 2.

The air pump 42 is provided in the air supply pipe 40 as a pumping unit that pumps air to the fuel cell 2. The air pump 42 is an electric pump in which an impeller disposed in a casing that forms a pump chamber is driven by the air pump electric motor 26.

The air pump electric motor 26 is an alternating current motor, an operation (a rotation speed) of which is controlled by an alternating current voltage output from the second inverter 25. Further, the second inverter 25 outputs the alternating current voltage at a frequency corresponding to a control signal output from a control apparatus 8, to be described below. By controlling the rotation speed in this manner, an air pumping capacity of the air pump 42 is controlled.

Moreover, an air pressure regulating valve 43 that regulates a pressure (a back pressure) of air on the air electrode side of the fuel cell 2 to a predetermined pressure is provided in the air exhaust pipe 41. An operation of the air pressure regulating valve 43 is controlled in accordance with a control signal output from the control apparatus 8.

The fuel cell vehicle air-conditioning apparatus 1 includes a cooling system 500 that controls a temperature of the fuel cell 2 by supplying cooling water to the fuel cell 2. The cooling system 500 includes a cooling water circulation circuit 5 that circulates/supplies the cooling water to the fuel cell 2.

The cooling water circulation circuit 5 includes a cooling water circulation flow passage 51 that circulates/supplies the cooling water to the fuel cell 2 and a radiator 55 to be described below, a bypass flow passage 52 that prevents the cooling water from flowing into the radiator 55, a cooling water circulation pump 53 that circulates the cooling water to the cooling water circulation flow passage 51, the bypass flow passage 52, and so on, an electric three-way valve 54 that controls the flow passage through which the cooling water circulates, and so on.

The radiator 55 is provided in the cooling water circulation flow passage 51. The radiator 55 functions as a heat-discharging heat exchanger that discharges heat from the cooling water by performing heat exchange between the cooling water and blown air blown from an air blowing fan 55a. Further, a cooling water temperature sensor 56 that detects a cooling water temperature Tw is provided in the cooling water circulation flow passage 51 on an outlet side of the fuel cell 2.

The cooling water circulation pump 53 is an electric pump that pumps the cooling water to the fuel cell 2 through the cooling water circulation circuit 5. A rotation speed (a flow rate) of the cooling water circulation pump 53 is controlled by a control signal output from the control apparatus 8.

The three-way valve 54 functions as a circuit switching unit for switching between the cooling water circulation flow passage 51 and the bypass flow passage 52. An operation of the three-way valve 54 is controlled by a control voltage output from the control apparatus 8.

More specifically, the three-way valve 54 includes three valves forming a first inlet, a second inlet, and an outlet. The first inlet of the three-way valve 54 is connected to an outlet side of the radiator 55 via the cooling water circulation flow passage 51, and the second inlet of the three-way valve 54 is connected to an outlet of the bypass flow passage 52. The outlet of the three-way valve 54 is connected to an inlet side of the cooling water circulation pump 53 via the cooling water circulation flow passage 51.

In the three-way valve 54, when the temperature of the cooling water is low (when the fuel cell 2 needs to be heated, for example), the first inlet is closed and the second inlet is opened. As a result, the cooling water circulates so as to pass through the bypass flow passage 52 without passing through the radiator 55, and therefore the temperature of the cooling water increases. When the temperature of the cooling water is high (when the temperature of the cooling water exceeds an upper limit temperature at which the fuel cell 2 can operate with stability, for example), on the other hand, the first inlet is opened and the second inlet is closed. As a result, the cooling water is cooled by the radiator 55 such that the temperature of the cooling water decreases.

A heater core circulation flow passage 6 that supplies the cooling water to a heater core 61 is connected to the cooling water circulation circuit 5. The heater core circulation flow passage 6 bifurcates from the cooling water circulation circuit 5 further upstream in a flow direction of the cooling water than a bifurcation point of the bypass flow passage 52 in the cooling water circulation circuit 5. In other words, an inlet side of the heater core circulation flow passage 6 is connected to the cooling water circulation circuit 5 between the bifurcation point of the bypass flow passage 52 and the cooling water temperature sensor 56. An outlet side of the heater core circulation flow passage 6 is connected to the cooling water circulation circuit 5 between the three-way valve 54 and the cooling water circulation pump 53.

Further, the heater core 61 and a shutoff valve 62 are provided in the heater core circulation flow passage 6. The shutoff valve 62 and the heater core 61 are disposed in that order from an upstream side of the heater core circulation flow passage 6 in the flow direction of the cooling water.

The heater core 61 functions as a heating heat exchanger that heats blown air (air-conditioning air) blown by a blower (not shown) by performing heat exchange between the blown air and the cooling water. The heater core 61 also functions as a waste heat collection unit used to heat the fuel cell vehicle by collecting at least a part of waste heat from the fuel cell 2 via the cooling system 500.

The shutoff valve 62 is an electric control valve that either shuts off or permits a supply of cooling water from the cooling water circulation flow passage 51 to the heater core 61. An operation of the shutoff valve 62 is controlled by a control voltage output from the control apparatus 8.

Next, an electric control system according to this embodiment will be described using FIG. 2. FIG. 2 is a block diagram showing the electric control system of the fuel cell vehicle air-conditioning apparatus according to this embodiment.

As shown in FIG. 2, the control apparatus 8 is constituted by a conventional microcomputer including a central processing unit (CPU), a read only memory (ROM), a random access memory (RAM), and so on, and peripheral circuits thereof. The control apparatus 8 controls operations of various devices connected to an output side thereof by performing various calculations and processes on the basis of an air-conditioning control program stored in the ROM.

The respective inverters 21, 25, the DC/DC converter 23, the respective pressure regulating valves 34, 43, the exhaust valve 35, the respective circulation pumps 36, 53, the air pump 42, the three-way valve 54, the air blowing fan 55a, the shutoff valve 62, and so on are connected to the output side of the control apparatus 8.

Further, a current sensor 27 that detects an output current of the fuel cell 2, a voltage sensor 28 that detects an output voltage of the fuel cell 2, an outside air temperature sensor (a cabin exterior temperature detection unit) 81 that detects a cabin exterior temperature (an outside air temperature) Tam, an inside air temperature sensor (a cabin interior temperature detection unit) 82 that detects a cabin interior temperature (an inside air temperature) Tr, a solar radiation sensor (a solar radiation amount detection unit) 83 that detects a solar radiation amount Ts entering the cabin interior, and so on are connected to an input side of the control apparatus 8.

Furthermore, operation signals from various air-conditioning operation switches provided on an operating panel 9 disposed in the vicinity of an instrument panel in a front portion of the cabin interior are input into the input side of the control apparatus 8. More specifically, the operating panel 9 is provided with an operating switch 91 of the fuel cell vehicle air-conditioning apparatus 1, a cabin interior temperature setting switch 92, a display unit 93 that displays a current operating state of the fuel cell vehicle air-conditioning apparatus 1 and the like, and so on. The cabin interior temperature setting switch 92 functions as a target temperature setting unit that sets a cabin interior target temperature Tset in response to a passenger operation.

Control units for controlling the respective control subject devices connected to the output side of the control apparatus 8 are integrated into the control apparatus 8, and configurations (hardware and software) for controlling operations of the respective control subject devices constitute the control units for controlling the operations of the respective control subject devices.

Figure 3:
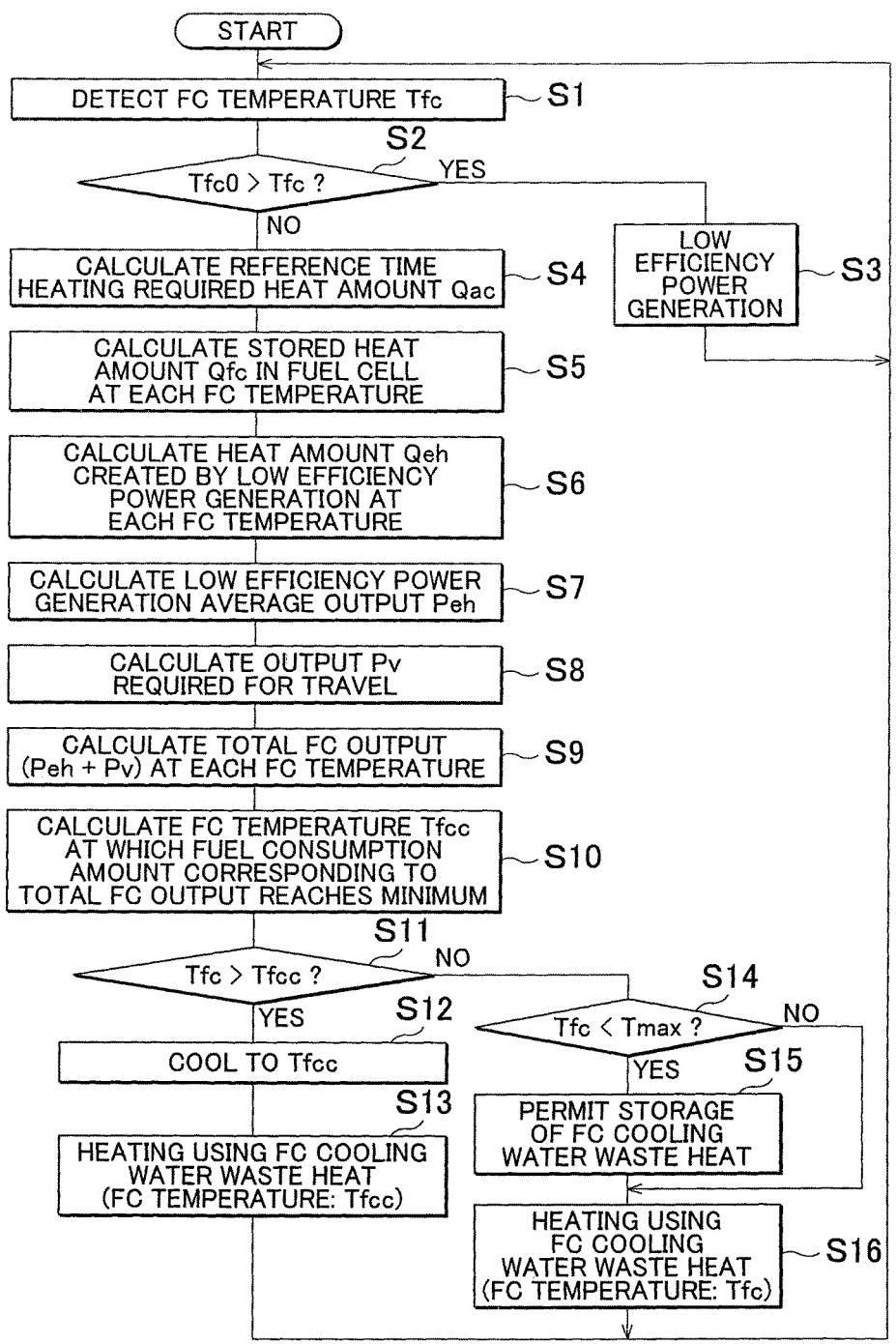
FIG. 3 is a flowchart showing control processing executed by the fuel cell vehicle air-conditioning apparatus.

Next, an operation of the fuel cell vehicle air-conditioning apparatus 1 according to this embodiment, having the above configuration, will be described using FIG. 3. FIG. 3 is a flowchart showing control processing executed by the fuel cell vehicle air-conditioning apparatus 1 according to this embodiment. The control processing is started when the operating switch 91 of the fuel cell vehicle air-conditioning apparatus 1 is switched ON.

First, in Step S1, the temperature of the fuel cell (to be referred to hereafter as a fuel cell temperature Tfc) is detected. More specifically, the cooling water temperature Tw on the outlet side of the fuel cell 2 is detected by the cooling water temperature sensor 56. Next, in Step S2, a determination is made as to whether or not the fuel cell temperature Tfc detected in Step S1 is lower than a predetermined reference temperature Tfc0.

An optimum operating temperature range of the fuel cell 2 in which the fuel cell 2 exhibits a required power generation capacity is limited, and outside the optimum operating temperature range, a performance of the fuel cell 2 deteriorates greatly. To suppress this deterioration, the reference temperature Tfc0 is determined and control is performed to ensure that the fuel cell temperature Tfc does not fall below the reference temperature Tfc0. Here, the reference temperature Tfc0 may be a lower limit value of the optimum operating temperature range of the fuel cell 2, or a higher value than the lower limit value of the optimum operating temperature range.

When it is determined in Step S2 that the fuel cell temperature Tfc is lower than the reference temperature Tfc0, the cooling water temperature is determined to be insufficiently high. Accordingly, the processing advances to Step S3, in which the fuel cell 2 is caused to perform an operation (to be referred to hereafter as low efficiency power generation) having a lower power generation efficiency than a normal operation, whereupon the processing returns to Step S1. By causing the fuel cell 2 to perform low efficiency power generation, an amount of heat discharged from the fuel cell 2 is increased. As a result, the fuel cell 2 functions as a heat creation unit that creates heat for heating the fuel cell vehicle.

More specifically, a stoichiometric ratio St of the air is set to be lower (St=1.0 to 1.2) than during a normal operation (St=1.5 to 2.0). In so doing, an amount of energy generated by power loss (i.e. heat loss), of the energy that can be extracted from a reaction between hydrogen and oxygen, is actively increased, and therefore the amount of heat discharged from the fuel cell 2 is increased. By increasing the amount of heat discharged from the fuel cell 2 in this manner, the temperature of the cooling water that absorbs the waste heat of the fuel cell 2 is increased.

In another method, the output voltage of the fuel cell 2 is stepped down by the DC/DC converter 23 while maintaining the output current of the fuel cell 2. In so doing, the output voltage can be reduced while maintaining a constant fuel consumption amount, and therefore the fuel cell 2 can be caused to perform low efficiency power generation, enabling an increase in the amount of heat discharged from the fuel cell 2.

When it is determined in Step S2 that the fuel cell temperature Tfc is not lower than the reference temperature Tfc0, on the other hand, the cooling water temperature of the fuel cell 2 is determined to be sufficiently high, and therefore the processing advances to Step S4. In Step S4, a reference time required heating heat amount Qac is calculated by referring to a control map stored in the control apparatus 8 in advance. The reference time required heating heat amount Qac is an amount of heat required to perform required heating for a predetermined reference time T0. Note that the calculation processing of Step S4 according to this embodiment functions as a required heating heat amount calculation unit that calculates the amount of heat required to perform the required heating for the reference time T0.

Figure 4:
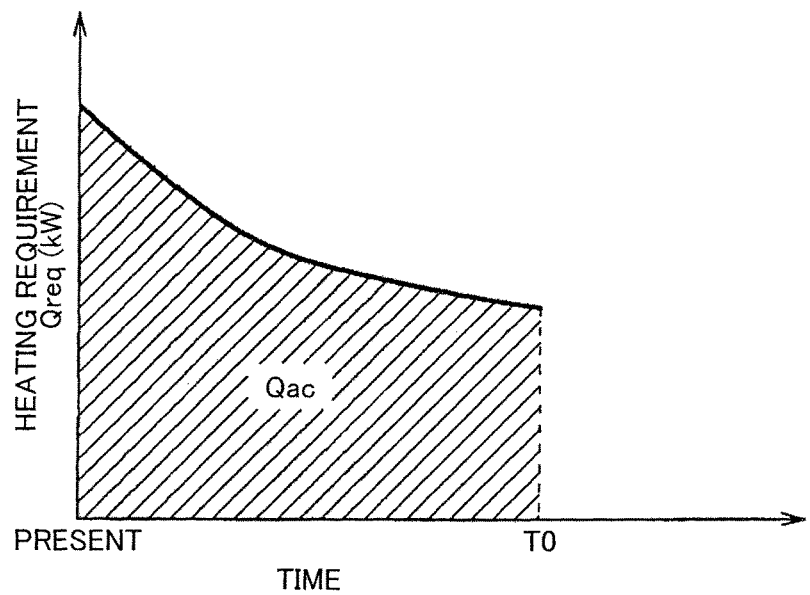
FIG. 4 is a view showing calculation of a reference time heating required heat amount Qac, which is used in Step S4 of FIG. 3.
Figure 5:
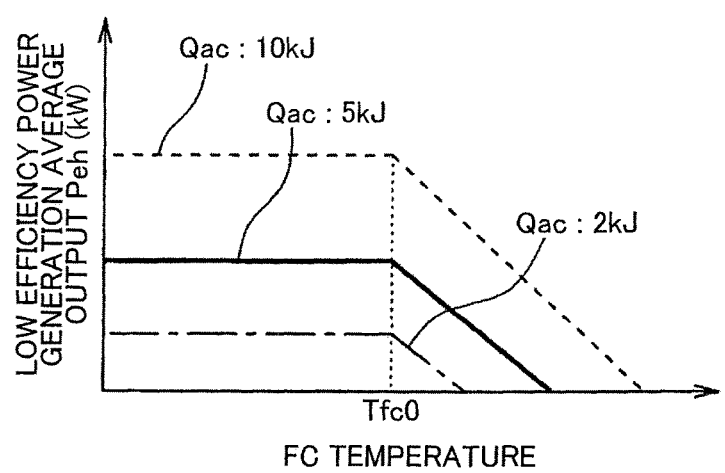
FIG. 5 is a view showing a control map for calculating a low efficiency operation mode average output Peh, which is used in Step S7 of FIG. 3.

More specifically, in the calculation processing of Step S4, first, an amount of heat (to be referred to hereafter as a heating requirement Qreq) required for the required heating is determined from the outside air temperature Tam, the inside air temperature Tr, the solar radiation amount Ts, the cabin interior target temperature Tset, and so on. Next, as shown in FIG. 4, the reference time required heating heat amount Qac is calculated on the basis of the reference time T0 and the heating requirement Qreq. In other words, the reference time required heating heat amount Qac is calculated by determining an area of a shaded portion of FIG. 4.

Next, in Step S5, a stored heat amount (to be referred to hereafter as a fuel cell stored heat amount Qfc) of the fuel cell 2 at each fuel cell temperature is calculated. Here, the fuel cell stored heat amount Qfc is an amount of stored heat in the fuel cell 2 and the cooling system 500. Note that the calculation processing of Step S5 according to this embodiment functions as a stored heat amount calculation unit that calculates the stored heat amount of the fuel cell 2.

More specifically, in the calculation processing of Step S5, the fuel cell stored heat amount Qfc is calculated from a following Formula 1.

$$Qfc = Qmass \times (Tfc - Tfc0) \quad (1)$$

Here, Qmass is a heat capacity of the fuel cell 2 and the cooling system 500, which takes a value measured in advance through experiment.

Next, in Step S6, a heat amount Qeh created by causing the fuel cell 2 to perform low efficiency power generation at each fuel cell temperature is calculated. More specifically, Qeh is calculated from a following Formula 2.

$$Qeh = Qac - Qfc \quad (2)$$

Here, Qeh is no smaller than 0.

Next, in Step S7, an average output (to be referred to hereafter as a low efficiency power generation average output Peh) during the reference time T0 when low efficiency power generation is performed at each fuel cell temperature is calculated. More specifically, the low efficiency power generation average output Peh is calculated on the basis of the reference time required heating heat amount Qac by referring to a map (see FIG. 5) stored in the control apparatus 8 in advance. Note that the low efficiency power generation average output Peh according to this embodiment is regarded as a heating power generation amount, and therefore the calculation processing of Step S7 according to this embodiment functions as a heating power generation amount calculation unit.

Next, in Step S8, an output (to be referred to hereafter as a travel output Pv) of the fuel cell 2 required for travel is calculated. More specifically, the travel output Pv is calculated on the basis of a sum of a travel load and a load of auxiliary devices other than the air-conditioning apparatus. Note that the travel output Pv according to this embodiment is regarded as a travel power generation amount, and therefore the calculation processing of Step S8 according to this embodiment functions as a travel power generation amount calculation unit.

Figure 6:
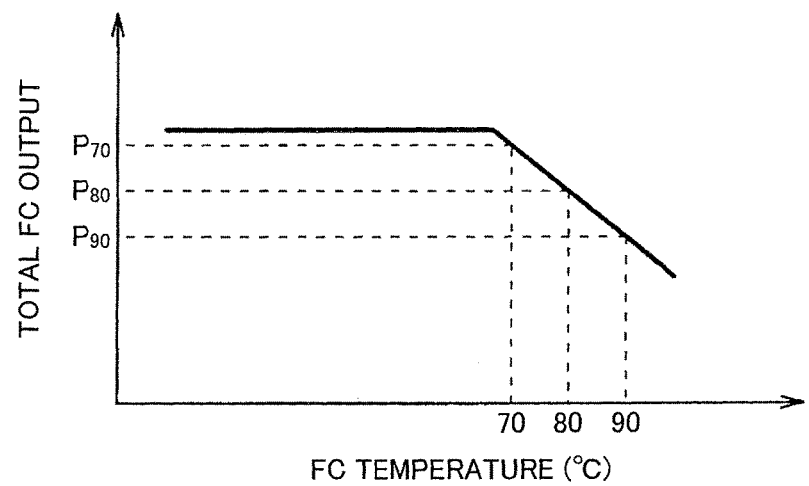
FIG. 6 is a characteristic diagram showing a relationship between a fuel cell temperature and a total output of a fuel cell 2.

Next, in Step S9, a total output (Peh+Pv) of the fuel cell 2, or in other words a sum of the low efficiency operation mode average output Peh and the travel output Pv, at each fuel cell temperature is calculated. As a result, a characteristic map expressing a relationship between the fuel cell temperature and the total output of the fuel cell 2, such as that shown in FIG. 6, is created.

Next, in Step S10, a temperature (to be referred to hereafter as an optimum temperature Tfcc) of the fuel cell 2 at which a fuel consumption amount required to output the fuel cell total output (Peh+Pv) calculated in Step S9 reaches a minimum is calculated. Note that the calculation processing of Step S10 according to this embodiment functions as an optimum temperature calculation unit.

More specifically, in the calculation processing of Step S10, first, the fuel cell total output at each fuel cell temperature is calculated by referring to the characteristic map (see FIG. 6) created in Step S9. As shown in FIG. 6, for example, the fuel cell total output is P90 when the fuel cell temperature is 90° C., P80 when the fuel cell temperature is 80° C., and P70 when the fuel cell temperature is 70° C.

Figure 7:
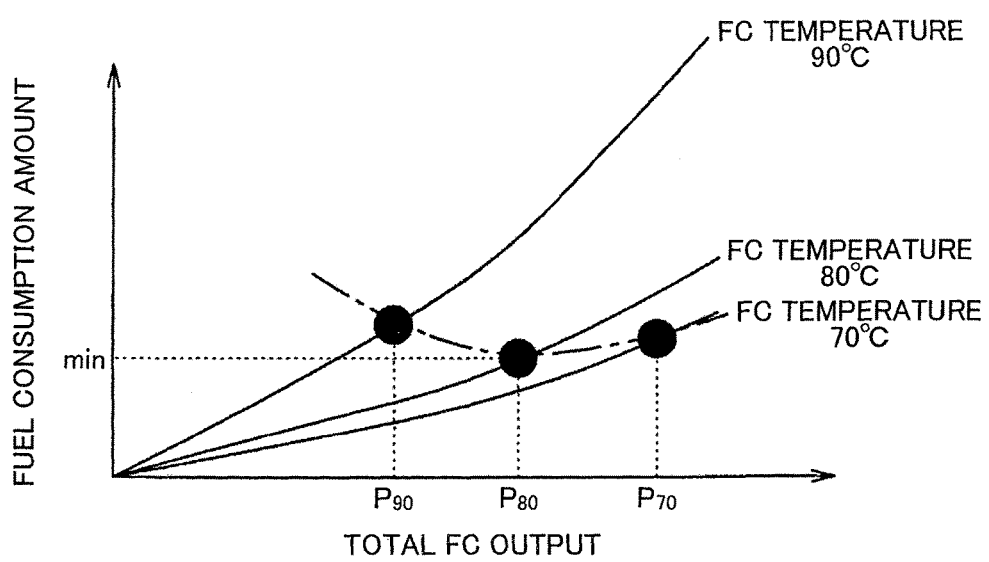
FIG. 7 is a view showing a control map for calculating an optimum temperature Tfcc, which is used in Step S10 of FIG. 3.

Next, the fuel consumption amount at each fuel cell temperature is calculated on the basis of the fuel cell total output at each fuel cell temperature by referring to a map (see FIG. 7) stored in the control apparatus 8 in advance. The calculated fuel consumption amounts at the respective fuel cell temperatures are then compared, and the fuel cell temperature at which the fuel consumption amount reaches a minimum is determined as the optimum temperature Tfcc. In this embodiment, as shown in FIG. 7, the fuel consumption amount reaches a minimum when the fuel cell temperature is 80° C., and therefore the optimum temperature Tfcc is 80° C.

Note that in this embodiment, to simplify the description, an example in which the fuel cell total output and the fuel consumption amount are calculated at fuel cell temperature intervals of 10° C. has been described, but the fuel cell total output and the fuel consumption amount may be calculated at fuel cell temperature intervals of 1° C.

Next, in Step S11, a determination is made as to whether or not the current fuel cell temperature Tfc exceeds the optimum temperature Tfcc calculated in Step S10. When it is determined in Step S11 that the current fuel cell temperature Tfc exceeds the optimum temperature Tfcc, the processing advances to Step S12, in which the fuel cell temperature Tfc is cooled to the optimum temperature Tfcc in order to reduce the fuel consumption amount. The processing then advances to Step S13. More specifically, the three-way valve 54 is controlled to allow the cooling water to flow into the radiator 55. As a result, the cooling water is cooled by the radiator 55, leading to a reduction in the temperature of the cooling water and a corresponding reduction in the fuel cell temperature Tfc.

In Step S13, heating using waste heat from the fuel cell cooling water is performed, whereupon the processing returns to Step S1. More specifically, the shutoff valve 62 is opened such that the cooling water (cooling water at the optimum temperature Tfcc) flows into the heater core 61 through the heater core circulation flow passage 6. As a result, the blown air can be heated by the heat of the cooling water, and therefore heating of the cabin interior can be realized. Note that the processing of Step S12 and the processing of Step S13 may be performed simultaneously.

When it is determined in Step S11 that the current fuel cell temperature Tfc does not exceed the optimum temperature Tfcc, or in other words that the current fuel cell temperature Tfc is equal to or lower than the optimum temperature Tfcc, on the other hand, the processing advances to Step S14, in which a determination is made as to whether or not the current fuel cell temperature Tfc is lower than a predetermined upper limit temperature Tmax.

As described above, the optimum operating temperature range of the fuel cell 2 is limited. Therefore, the upper limit temperature Tmax is determined and control is performed to ensure that the fuel cell temperature Tfc does not exceed the upper limit temperature Tmax. Here, the upper limit temperature Tmax may be an upper limit value of the optimum operating temperature range of the fuel cell 2, or a lower value than the upper limit value of the optimum operating temperature range.

When it is determined in Step S14 that the current fuel cell temperature Tfc is lower than the predetermined upper limit temperature Tmax, it is determined that the fuel cell temperature may be increased. Accordingly, the processing advances to Step S15, in which storage of the cooling water waste heat in the fuel cell 2 and the cooling system 500 is permitted, whereupon the processing advances to Step S16. More specifically, the three-way valve 54 is controlled to prevent the cooling water from flowing into the radiator 55.

When it is determined in Step S14 that the current fuel cell temperature Tfc is not lower than the predetermined upper limit temperature Tmax, on the other hand, it is determined that the fuel cell temperature may not be increased, and therefore the processing advances as is to Step S16.

In Step S16, heating using the waste heat of the fuel cell cooling water is performed, whereupon the processing returns to Step S1. More specifically, the shutoff valve 62 is opened such that the cooling water (cooling water at the fuel cell temperature Tfc) flows into the heater core 61 through the heater core circulation flow passage 6. As a result, the blown air can be heated by the heat of the cooling water, and therefore heating can be realized.

By performing the operation described above, the fuel cell vehicle air-conditioning apparatus 1 according to this embodiment exhibits effects such as the following.

First, the optimum temperature Tfcc is calculated as described in Control Step S10. Here, the optimum temperature Tfcc is a fuel cell temperature at which the fuel consumption amount required for the fuel cell 2 to output (generate) the fuel cell total output (Peh+Pv), which is the sum of the low efficiency power generation average output Peh and the travel output Pv, reaches a minimum.

Next, the cooling system 500 is cooled such that the fuel cell temperature reaches the optimum temperature Tfcc. More specifically, as described in Control Steps S11 and S12, when the fuel cell temperature Tfc exceeds the optimum temperature Tfcc, the fuel cell temperature Tfc is cooled to the optimum temperature Tfcc. On the other hand, as described in Control Steps S11, S14, and S15, when the fuel cell temperature Tfc is equal to or lower than the optimum temperature Tfcc and also lower than the upper limit temperature Tmax, the waste heat of the fuel cell 2 is stored in the fuel cell 2.

Thus, the fuel consumption amount can be reduced, and therefore deterioration of the vehicle fuel efficiency can be suppressed. Further, the control illustrated in FIG. 3 is performed not only when the vehicle performs an idling stop but also during a normal operation, and therefore heating can be performed in the fuel cell vehicle during a normal operation. As a result, heating can be performed in the fuel cell vehicle during a normal operation while suppressing deterioration of the vehicle fuel efficiency.

The invention is not limited to the embodiment described above, and as illustrated below, various amendments may be applied thereto within a scope that does not depart from the concept of the invention.

In the example described in the above embodiment, the fuel cell 2 is employed as the heat creation unit and heat for heating the fuel cell vehicle is created by causing the fuel cell 2 to perform low efficiency heat generation in order to increase the amount of heat discharged from the fuel cell 2. However, the heat creation unit is not limited thereto.

For example, an electric heater such as a positive temperature coefficient (PTC) heater or a combustion heater that generates heat by burning a fuel (hydrogen gas) may be employed as the heat creation unit.

In the example described in the above embodiment, the electric three-way valve 54 is employed as the circuit switching unit for switching between the cooling water circulation flow passage 51 and the bypass flow passage 52. However, the circuit switching unit is not limited thereto, and instead, a thermostat valve, for example, may be employed. A thermostat valve is a cooling water temperature responsive valve constituted by a mechanical mechanism that opens and closes a cooling water passage when a valve body thereof is displaced by thermowax (a temperature sensitive member) that varies in volume in response to temperature variation.

The invention claimed is:

1. A fuel cell vehicle air-conditioning apparatus comprising:
    a fuel cell that generates power by an electrochemical reaction between an oxidant gas and a fuel gas;
    a cooling system that adjusts a temperature of the fuel cell;
    a waste heat collection unit that collects at least a part of waste heat from the fuel cell through the cooling system and uses the collected waste heat to heat a cabin interior of a fuel cell vehicle;
    a heat creation unit that creates heat for heating of the cabin interior of the fuel cell vehicle; and
    a control apparatus including:
        a stored heat amount calculation unit programmed to calculate an amount of stored heat in the fuel cell (Qfc);
        a reference time required heat amount calculation unit programmed to calculate a required heating heat quantity (Qac) that is an amount of heat required to heat the cabin interior of the fuel cell vehicle for a predetermined reference time;
        a heating power generation amount calculation unit programmed to calculate a power generation amount for heating of the cabin interior of the fuel cell vehicle (Peh) that is an amount of power generation of the fuel cell required for heating of the cabin interior of the fuel cell vehicle performed by the heat creation unit, based on the required heating heat quantity (Qac) and the amount of stored heat in the fuel cell (Qfc);
        a traveling power generation amount calculation unit programmed to calculate the traveling power generation amount (Pv) that is an amount of power generation of the fuel cell required for traveling of the fuel cell vehicle;
        a temperature calculation unit programmed to calculate a fuel consumption amount required for the fuel cell to generate a total power generation amount of the amount of the power generation amount for heating of the cabin interior of the fuel cell vehicle (Peh) and the traveling power generation amount (Pv), and to determine an ideal temperature (Tfcc) that is a temperature of the fuel cell at which the fuel consumption amount that corresponds to the total power generation amount is minimum compared to other fuel consumption amounts at other temperatures of the fuel cell; and
        a control unit programmed to control the cooling system such that the temperature of the fuel cell is the ideal temperature.

2. The fuel cell vehicle air-conditioning apparatus according to claim 1, wherein when the temperature of the fuel cell exceeds the ideal temperature, the control unit is programmed to perform control to reduce the temperature of the fuel cell to the ideal temperature.

3. The fuel cell vehicle air-conditioning apparatus according to claim 1, wherein when the temperature of the fuel cell is lower than the ideal temperature, the control unit is programmed to perform control to store the waste heat from the fuel cell into the fuel cell.

4. The fuel cell vehicle air-conditioning apparatus according to claim 1, wherein the heat creation unit increases an amount of heat discharged from the fuel cell by reducing a power generation efficiency of the fuel cell below that of a normal operation.

5. The fuel cell vehicle air-conditioning apparatus according to claim 1, wherein the heat creation unit is an electric heater.

6. The fuel cell vehicle air-conditioning apparatus according to claim 1, wherein the heat creation unit is a combustion heater that generates heat by burning a fuel.

7. The fuel cell vehicle air-conditioning apparatus according to claim 1, wherein the reference time required heat amount calculation unit is programmed to calculate the required heating heat quantity (Qac) based on at least one of a target temperature of the cabin interior (Tset) set by a target temperature setting unit for setting the target temperature of the cabin interior (Tset) by operation of a passenger, a cabin exterior temperature (Tam) that is a temperature on an outside of the cabin, a cabin interior temperature (Tr) that is a temperature in the cabin interior, and a solar radiation amount entering the cabin interior (Ts).

8. The fuel cell vehicle air-conditioning apparatus according to claim 1, wherein the stored heat amount calculation unit is programmed to calculate the amount of stored heat in the fuel cell (Qfc) based on at least one of a temperature of the fuel cell (Tfc), a heat capacity of the cooling system (Qmass), and the ideal temperature (Tfcc).

* * * * *